March 13, 1973 R. W. NORDIN 3,720,076
CONSTANT TORQUE CLUTCHES
Filed March 26, 1971
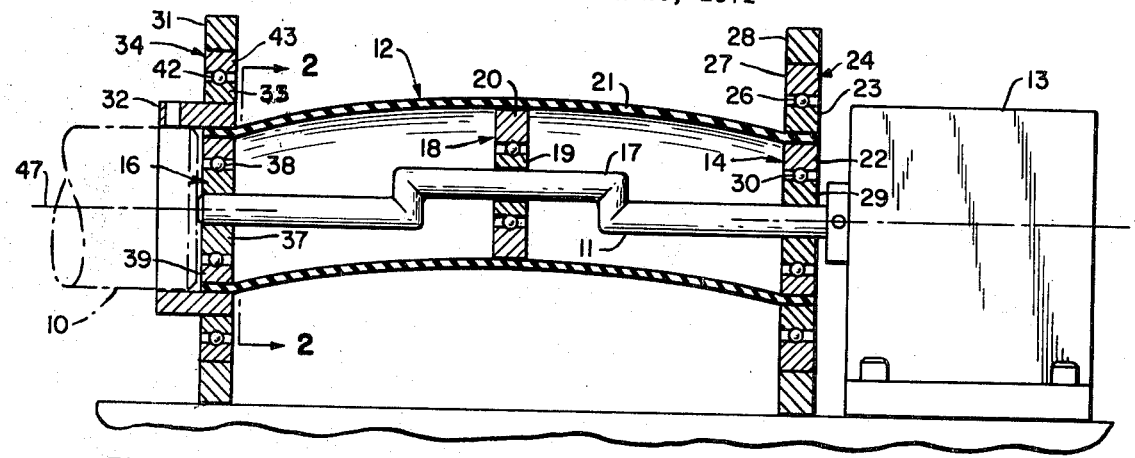
FIG. I
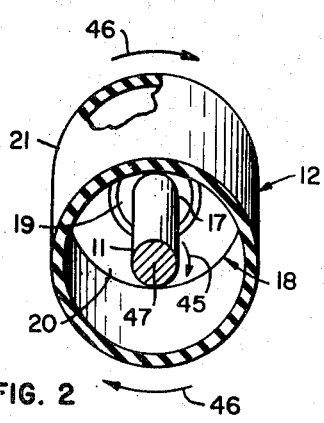
FIG. 2
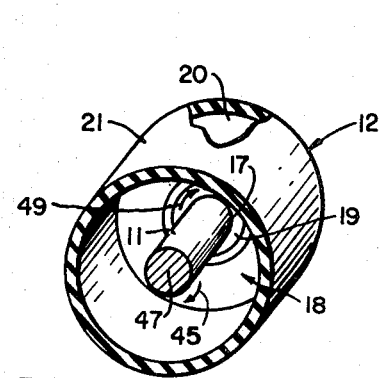
FIG. 3
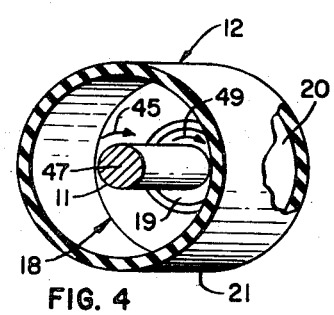
FIG. 4
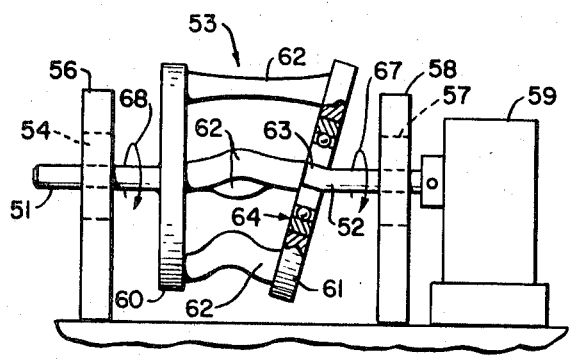
FIG. 5
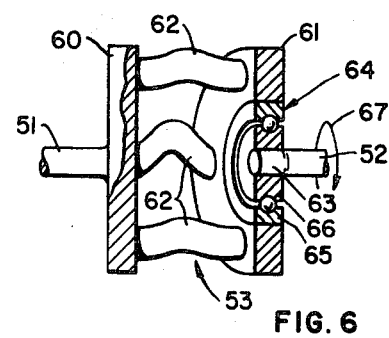
FIG. 6
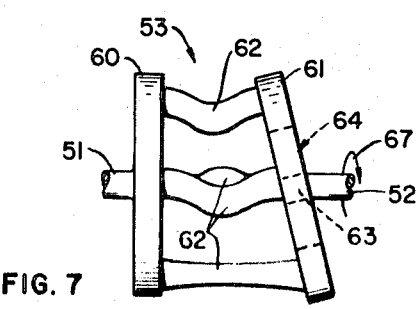
FIG. 7
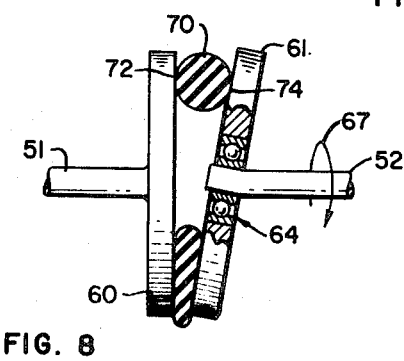
FIG. 8

United States Patent Office 3,720,076
Patented Mar. 13, 1973

3,720,076
CONSTANT TORQUE CLUTCHES
Robert W. Nordin, Skokie, Ill., assignor to Teletype
Corporation, Skokie, Ill.
Filed Mar. 26, 1971, Ser. No. 128,417
Int. Cl. F16d *3/14*
U.S. Cl. 64—27 HM          18 Claims

ABSTRACT OF THE DISCLOSURE

A clutch disposed between an input shaft and an output shaft is designed to slip if an excessive torque load is placed on the output shaft or if excessive power is delivered to the clutch by the input shaft. The output shaft is connected positively to a flexible, deformable member or members while the input shaft delivers motion to the deformable member or members through rotation of an eccentrically disposed section of the input shaft. For transmission of motion between the input shaft and the output shaft all elements of the clutch including the flexible member rotate as a unit; however, upon encountering an excessive torque load on the output shaft, the clutch will slip as the rotating eccentric portion of the input shaft deforms the deformable member or members and thereby absorbs the excessive torque.

BACKGROUND OF THE INVENTION

Field of the invention

This invention relates to a constant torque clutch and more particularly, to a clutch which slips upon having excessive torque applied thereto and absorbs the excessive torque within a deformable member.

Technical considerations and prior art

In transferring rotary motion between two shafts it is often necessary to limit the amount of torque transferred in order to protect mechanisms associated therewith from excessive torque. For example, a mechanism associated with an output shaft might suddenly jam threatening to overload a motor driving an input shaft, in which case, it is necessary to provide a constant torque clutch which slips to protect the driving motor.

On the other hand, it might be desired to provide a device which delivers a constant output torque irrespective of the load on an output shaft or the power supplied by an input shaft. For example, in an intermittent drive mechanism where the output shaft is alternately restrained from rotation and released, it is often desirable to deliver a constant torque to the output shaft as soon as it is released without having to start rotation of a driving motor.

Generally, these problems have been met in the prior art by mechanical clutches which depend upon the coefficient of friction between two or more abutted surfaces to both transmit torque and, by slipping, to limit the transmission of torque to a predetermined value. However, when these clutches slip one or both of these abutting surfaces wear since the slippage results in abrasion of one or both of the surfaces. As the surfaces wear, abrasion dust is formed leading to an acceleration of the deterioration of the clutch. Furthermore, as these clutching surfaces wear, there is the added problem of misalignment of the clutch elements leading, again, to shortened effective clutch life.

SUMMARY OF THE INVENTION

An object of this invention is to provide a new and improved constant torque clutch.

Another object of this invention is to provide a new and improved constant torque clutch in which there is no abrasion between abutting surfaces.

A further object of the invention is to provide a clutch wherein excessive overload is absorbed in the flexing of a resilient member included in the power train of the clutch.

In accordance with the preferred embodiments of the invention, a clutch is provided in which excessive torque applied to the clutch is absorbed by deforming a flexible instrumentality or member. More particularly, one section of the flexible instrumentality is positively connected to an output shaft and another portion has a bearing association with an eccentric portion of an input shaft which may be aligned with the output shaft. During transmission of drive between the input and output shafts, the eccentric portion is disposed to retain the flexible member in one deformed state and the driving motion is transmitted from the input shaft, through the eccentric portion, and through the flexible member which rotate as a unit with the output shaft. However, when excessive torque is applied to the clutch through either the output or input shaft and there exists a predetermined difference of torque, the input shaft will slip relative to the rigid member causing the eccentrically mounted rigid member to rotate independently of the flexible member. As the rigid member rotates, it will continuously flex successive portions of the flexible member which thereby will absorb the excessive torque.

BRIEF DESCRIPTION OF THE DRAWINGS

FIG. 1 is a side view, partially in section, of a first embodiment of the invention showing a clutch with a flexible tube which is connected to an output shaft and deformed by an eccentrically mounted bearing on an input shaft;

FIG. 2 is a schematic end view taken in the direction indicated by arrows 2—2 in FIG. 1 showing the flexible tube rotating to drive the output shaft;

FIGS. 3 and 4 are schematic end views similar to FIG. 2, however, showing the tube in an overloaded-stalled condition while the eccentrically mounted bearing rotates within the tube;

FIG. 5 is a side view of an alternative embodiment of the invention showing a clutch having a plurality of rubber couplings which are connected to an output shaft and deformed by an eccentrically mounted wobble plate on an input shaft;

FIG. 6 is a partial view of the clutch shown in FIG. 5 partially cut away illustrating the position assumed by the wobble plate after the input shaft has rotated 90° from its position in FIG. 5 while the wobble plate is restrained from rotation due to excessive torque being applied to the clutch;

FIG. 7 is a partial view of the clutch shown in FIG. 5 illustrating the position assumed by the wobble plate after the input shaft has rotated 180° from its position of FIG. 5 while the wobble plate is restrained from rotation due to excessive torque being applied to the clutch; and FIG. 8 is a side view, partially in section, of yet another embodiment of the invention.

DETAILED DESCRIPTION OF THE INVENTION

Referring now to FIGS. 1-4 there is illustrated one specific embodiment of the invention in which an output shaft 10 is coupled to an input shaft 11 by a clutch, designated generally by the numeral 12. The clutch 12 is designed to allow the input 11 to move relative to the output shaft 10 when a torque greater than a predetermined torque is applied through the clutch. In other words the clutch 12 insures that a constant output torque will be delivered irrespective of the load applied to the output shaft 10 or the power supplied to the input shaft 11. When there is an excessive load placed on the output shaft or there is an excessive drive torque tending to overdrive the output shaft resulting in a predetermined difference of torque being applied to the clutch, the clutch will function to absorb the difference.

The input shaft 11 may be driven by a conventional power source such as an electric motor 13 and is journaled within a pair of supporting ball bearings, designated generally by the numerals 14 and 16. Midway along its length the input shaft 11 has an offset portion 17 which results in the input shaft functioning as a crank as it rotates. Mounted on the offset portion 17 is a bearing, designated generally by the numeral 18, which has an inner race 19 fixed to the offset portion 17, a set for retained balls 25 and an outer race 20 fixed to a flexible tube 21.

The right hand end of the tube 21 is secured to an outer race 22 of the bearing 14 and an inner race 23 of a concentric bearing 24. In turn, bearing 24 has a set of balls 26 and an outer race 27 seated within an opening found in an upright frame 28 to which the outer race is secured. The bearing 14 has an inner race 29 secured to the input shaft and a set of retained balls 30. With this arrangement of concentric ball bearings, the tube 21 may rotate relative to both the frame 28 and the shaft 11. More specifically, since the races 23 and 27 are separated by balls 26 and the races 22 and 29 are separated by balls 30, the races 22 and 23 will rotate as a unit with the right-hand end tube 21, allowing the right-hand end of the tube 21 to rotate independently of the input shaft 11.

The left-hand end of the tube 21 is rotatably mounted within an upright frame 31 in much the same fashion as the righthand end is mounted within the upright frame 28; however, a collar 32 externally is secured to an inner race 33 of a bearing designated generally by the numeral 34 and internally is secured to the lefthand end of the tube. The collar 32 is in turn fixed to the output shaft 10, rigidly connecting the left-hand end of the tube 21 to the output shaft. The bearing 16 has an inner race 37 fixed to the shaft 11, a set of balls 38, and an outer race 39 fixed to the inside of tube 21; while the bearing 34 has a set of balls 42 and an outer race 43 seated within and secured to frame 28. This, of course, allows the tube 21, collar 32 and output shaft 10 to rotate as a unit independent of the input shaft 11 since the inner and outer races 33 and 43 of the bearing 34 are separated by balls 42 while the inner and outer races 37 and 39 of the bearing 16 are separated by balls 38.

In order for the input shaft 11 to drive the output shaft 10 there must be a couple between the two shafts since the output shaft and the ends of the tube 21 are rotatably independent of the input shaft. This couple is provided by the bearing 18 which is mounted on the offset portion 17 of the input shaft 11 so that the bearing 18 and the offset portion can act as a crank. The tube 21 when disassembled is a cylinder. Its bearing association when assembled and through the bearing 18 produces a flexed, bowed or arcuate profile longitudinally thereof.

In consequence of the foregoing construction, rotation of the shaft 11 may cause bearing 18 and tube 21 to rotate, as a unit, the tube retaining its bowed or arcuate attitude. In such event, the right-hand end of the tube will move with the input shaft 11, the bearing 14 rotating as a unit together with the inner race 23 and independently of outer race 27. Such motion of the tube will be transmitted to output shaft 10, the bearing 16 and inner race 33 rotating as a unit and independently of outer race 43.

The tube 21 is made from a material such as Teflon which has a certain degree of stiffness or resistance to flexion. However, it also has a resilient, elastic or self restoring deformable characteristic whereby it can be effectively stretched or flexed in a dimension transverse of its longitudinal axis upon being subject to a predetermined force. This latter flexibility or stretchability is referred to as "transverse" deformability or flexibility to distinguish it from longitudinal flexibility or bowing to produce the aforesaid arcuate attitude or profile longitudinal of the tubular axis. Each time the tube 21 is flexed transversely, it absorbs mechanical energy which is then released as heat. In other words, there is a loss of mechanical energy as the tube 21 is flexed transversely. The amount of force necessary for transversely flexing the tube 21 is dependent upon its material composition and increases with the increase in its thickness. Therefore, the level of the force necessary to effectively flex the tube can be controlled by controlling composition or the thickness of the tube.

The mechanical energy lost in flexing the tube 21 is analogous to the hysteresis loss incurred upon magnetizing and demagnetizing a magnetic material. Since energy is absorbed and converted to heat whenever a non-perfectly elastic material is flexed, flexure will not occur until a predetermined energy level is exceeded. When this level is exceeded, the resistance of the tube to transverse flexion is overcome and the tube will flex transversely and absorb the energy in excess of this level. Herein, this level is referred to as the threshold of deformability.

OPERATION

When the torque load on the output shaft 10 does not exceed the threshold of deformability, the resistance of the tube to transverse flexion or stretching prevents such occurrence and the condition of FIG. 2 occurs. In FIG. 2 the tube 21 rotates in its longitudinally bowed attitude, in the direction of arrow 46, and about the longitudinal axis of shaft 11, as rigid unit directly. It transfers motion from the input shaft 11 which rotates in the direction of the arrow 45, to the output shaft 10 (FIG. 1), thereby rotating the output shaft at the same speed as the input shaft.

As long as the tube 21 does not flex transversely, it acts as a rigid member for causing the entire clutch 12 to rotate as a rigid unit together with the bearings 14 and 16 and the inner races 23 and 33, and independently of outer races 27 and 43. Moreover, during rotation, the tube 21 maintains its longitudinally bowed or flexed attitude. In other words, the inner race 19 and outer race 20 of the bearing 18 do not move relative to one another as the input shaft 11 rotates but unite with the tube 21 in rotating as a rigid unit with the input shaft 11 and output shaft 10.

When a load generating a torque in excess of the threshhold of transverse deformability is applied to the output shaft 10, both the output shaft and the tube 21 stall as illustrated in FIGS. 3 and 4. Correspondingly, the outer race 20 will also stall. However, the input shaft 11 and the inner race 19 continue to rotate in the direction of the arrow 45 while the clutch 12, by slipping, then functions to limit the torque applied through the tube 21 to the output shaft. Clutch slippage is attended by transverse stretching or flexure which moves about the tube in consequence of the pressure of the rotation of offset portion 17 while the tube 21 is restrained. Restated, the offset portion 17 rotates relative to the tube and acts as a crank within the tube causing the inner race 19 of the bearing 18, which is fixed to the offset portion, to rotate in the direction of the arrow 48 relative to the outer race 20, which is fixed to the tube. As the inner race 19 moves relative to the outer race 20, the tube 21 flexes transversely about the axis 47 to produce an undulating effect which moves in a circuit about axis 47, following the path of rotation of offset portion 17, though the tube is retained from rotation, as illustrated by FIGS. 3 and 4. In the process the tube absorbs the torque delivered by the input shaft 11, whereby, the clutch 12 protects the motor 13 from being mechanically overloaded and provides a readily available source of constant output torque to the output shaft 10. As soon as the overload is removed from the output shaft 10, it will begin rotating with a constant torque.

The clutch 12 also controls the amount of torque delivered from the input shaft 11 to the output shaft 10 by insuring that torque delivered to the output shaft is not greater than the threshhold of deformability of the tube 21. If, for example, the motor 13 generates a higher torque through the input shaft 11 than is desired at the output shaft 10, so as to tend to overdrive the ouput shaft, the clutch 12 limits the amount of torque delivered to the output shaft to the predetermined value by slipping and absorbing the torque in excess of the predetermined value. In such event the inner race 19 rotates independently of the outer race 20, and tube 21 undulates in the manner aforesaid.

Only a predetermined amount of torque can be transmitted through the tube 21 before the resistance of the tube to transverse stretching is overcome and the tube flexes transversely in such a way as to absorb the torque in excess of the threshold of deformability while transmitting the torque below such excess level. When there is excessive torque applied by the input shaft 11, the clutch 12 functions in essentially the same way as when there is an excessive load on the output shaft 10. Which is to say, instead of rotating as a rigid unit transmitting all motion directly from the input shaft to the output shaft, the clutch slips so that the input shaft rotates faster than the output shaft. However, since the input shaft 11 rotates faster than the output shaft 10, the tube 21 is flexed transversely and simultaneously is rotated about axis 47. As the tube 21 flexes transversely, it absorbs the torque exceeding the threshold level, below said level being available and delivered to the output shaft 10.

From the above discussion, it is apparent that the clutch 12 can serve as a readily available source of constant torque. For example, in a cyclic operation, the output shaft 10 might alternately be restrained from rotation and then released. In such a situation, it may be desirable to have the output shaft 10 deliver a constant torque immediately upon releasing the output shaft.

SECOND EMBODIMENT

Referring now to FIGS. 5–7, there is shown a second embodiment of the invention in which an output shaft 51 is coupled to an input shaft 52 by a clutch, designated generally by the numeral 53, which functions in a manner similar to the clutch 12 of FIGS. 1–4 in that the clutch will prevent the transmission of excessive torque. The output shaft 51 is journaled within a bearing 54 mounted in a support 56 while the input shaft 52 is journaled within a bearing 57 axially aligned with the bearing 54 and mounted in a support 58. A conventional power source such as a constant speed electric motor 59 drives the input shaft 52.

In the clutch 53, a disc 60 is joined to a wobble plate 61 by a plurality of identical, equiangularly spaced flexible couplings or deformable members 62 in the form of short rods or studs. They are secured at their outer ends to the peripheral portions of disc 60 and wobble plate 61. The cross sectional configuration of these studs may be round, square, or other geometrical shapes so as to attain various degrees of resistance to flexion, or ability to resist deformation. The disc 60 is fixed rigidly to the output shaft 51; while the wobble plate 61 is mounted about an offset portion 63 of the input shaft and is connected thereto by a ball bearing 64 having an outside race 65 secured to the wobble plate and an inside race 66 secured to the offset portion (FIG. 6). Like the tube 21 of FIG. 1, the flexible couplings 62 are elastomeric being made from a resilient material which will resist flexing until a force exceeding the threshold of deformability is applied, and thereafter may be flexed repeatedly. Each coupling 62 is adapted to absorb mechanical energy upon being flexed and return to its original shape. A material such as silicone rubber exhibits these characteristics and when it is deformed and then returned to its original shape has properties like Teflon which are analogous to the hysteresis properties of a magnetic material. The couplings 62 also have a resistance to flexion which means that the coupling will not flex until a force is applied which exceeds the threshold of deformability. The threshold is determined by the geometrical dimensions and shapes of the coupling and the composition of the material from which the coupling is constructed.

OPERATION OF THE SECOND EMBODIMENT

As illustrated by arrows 67 and 68 in FIG. 5, the input shaft 52 will drive the output shaft 51 at the same speed as the input shaft as long as either the load on the output shaft or power applied to the input shaft does not cause the torque difference applied to disc 60 and the wobble plate 61 of the clutch 53 to exceed the threshold of deformability of the couplings 62. When operating the clutch 53 below this threshold, the couplings 62 remain in a quiescent state and the clutch rotates as a rigid unit directly linking the input shaft 52 to the output shaft 51. Due to the inherent resistances of the couplings 62 to flexing forces, the wobble plate 61 does not change its orientation relative to either the disc 60 or the offset portion 63 on the input shaft 52.

Now suppose a load creating an excessive torque in the clutch 53 is applied to the output shaft 51 tending to impede rotation of the output shaft. In order to rotate the output shaft 51, the clutch 53 then has to transmit more torque from the input shaft 52 than the couplings 62 can transmit without flexing. In this instance, the disc 60 and the wobble plate 61 are restrained from rotating as in FIGS. 6 and 7; and as a result, the offset portion 63 with race 66 rotates within the bearing 64 relative to the wobble plate 61 and race 65. As seen in the progression from FIG. 6 to FIG. 7 rotational restraint of the wobble plate 61 conjoined with rotation of the input shaft 52 causes the wobble plate to oscillate or wobble relative to the disc 60 rather than rotate, thereby compressing and flexing each successive stud-like coupling 62. The couplings 62 flex because the torque resisting rotation is greater than the applied torque by an amount that is greater than the torque which can be transmitted without flexing the couplings.

When the output shaft 51 is restrained from rotation while the input shaft 52 is rotating, the clutch 53 applies a constant torque on the output shaft even though the output shaft is restrained. When the excessive load is removed, the output shaft 51 immediately begins rotating with a constant torque. The clutch 53 therefore serves as a readily available source of constant torque.

Like the clutch 12 in the embodiment of FIGS. 1–4, the clutch 53 can also prevent torque in excess of a predetermined amount from being transmitted from the motor 59 to the output shaft 51. As previously explained in the excessive load situation, the couplings 62 flex if an attempt is made to overdrive or transmit excessive power to the input shaft. As the couplings flex, the offset portion 63 of the input shaft 52 slips in the bearing 64 to wobble the wobble plate 61 relative to the disc 60 thereby preventing excessive torque from the input shaft from being delivered to the output shaft 51. The energy generated by the excessive torque is absorbed in flexing the couplings 62 and is in turn dissipated as heat.

THIRD EMBODIMENT

In the form of the invention shown in FIG. 8, an elastomeric ring 70 having a doughnut-like shape replaces the couplings 62 of FIGS. 5–7. The ring preferably has substantially the same diameter as the disc 60 and the wobble plate 61 between which it is disposed. Opposed faces 72 and 74 of the ring are secured to the peripheral portions of the disc and wobble plate by any suitable means. Thereby, uniform application of output torque on shaft 51 is maximized as the input shaft rotates.

While several embodiments of the invention have been described in detail above, it will be apparent that various modifications may be made from the specific details described without departing from the spirit and scope of the invention.

I claim:

1. In a clutch for transmitting torque from an input shaft to an output shaft, the combination of: a flexible tubular member connected to one of said shafts, said tubular member characterized by the ability to resist deformation until subjected to a predetermined force, whereafter the continued and cyclic application of said force deforms said tubular member;
an offset component in bearing association with said tubular member; and
a pair of bearing members, one of which is secured to said tubular member and the other of which is secured to said offset component, said bearing members being responsive to a predetermined difference of torque imparted to the output and input shafts for flexing said tubular member to absorb said difference of torque.

2. In a clutch for transmitting constant torque from an input shaft to an output shaft, the combination of:
at least one elastomeric member connected to one of said shafts, said elastomeric member characterized by the ability to resist deformation until subjected to a predetermined force, whereafter the continued and cyclic application of said force deforms said elastomeric member;
a wobble plate connected to said elastomeric member; and
an angularly projecting section on the other of said shafts journaled in said wobble plate and responsive to a predetermined difference of torque imparted to the output and input shafts for flexing said flexible means to absorb said difference of torque.

3. In a clutch for transmitting constant torque from an input shaft to an output shaft, the combination comprising:
flexible means positively connected to one of said shafts, said flexible means characterized by the ability to resist deformation until subjected to a predetermined force, whereafter the continued and cyclic application of said force deforms said flexible means;
an offset component associated with said flexible means; and
a pair of bearing members, one of which is secured to said flexible means and the other of which is secured to said offset component, said bearing members responsive to a predetermined difference of torque imparted to the output and input shafts to flex said flexible means to absorb said difference of torque.

4. In a clutch as defined in claim 3, wherein:
said offset component comprises a wobble plate connected to said flexible means, and characterized by an angularly projecting section of the other of said shafts journaled in said wobble plate.

5. In a clutch as defined in claim 4, wherein:
said flexible means is a series of equiangularly spaced stud-like members; and
said wobble plate is connected to said flexible means.

6. A clutch for limiting to a predetermined value torque transmitted therethrough from an input shaft to an output shaft comprising:
an eccentric means disposed on one of the shafts;
a rigid member mounted on the eccentric means for eccentric rotation therewith relative to the input and output shafts;
flexible means deformed by said rigid member and secured to the other of said shafts for coupling the input shaft to the output shaft for rotation together when the torque transmitted is less than the predetermined value, said flexible means dissipating the motion of the input shaft upon being repeatedly deformed by relative eccentric rotation of the rigid member when the torque being transmitted is greater than the predetermined value allowing the input shaft to move relative to the output shaft.

7. The clutch of claim 6 wherein the input shaft and output shaft are axially aligned.

8. The clutch of claim 7 wherein the rigid member retains the flexible member in a deformed condition.

9. The clutch of claim 6 wherein the deformable means is a tube axially aligned at one end with the axis of rotation of the output member and wherein the rigid member is centered on the offset portion of the input shaft and positioned within the tube for rotation relative thereto to deform the tube.

10. The clutch of claim 6 wherein the deformable means is a flexible ring positively secured to the rigid member and extending from the output member.

11. The clutch of claim 10 wherein the rigid member is a plate which wobbles to alternate tension and compress the ring when an excessive load is applied to the clutch.

12. A clutch responsive to excessive loads for limiting the torque transmitted therethrough comprising:
an output member disposed for rotation about an axis;
an input shaft axially aligned with the axis of rotation of the output member;
an offset portion on said input shaft, said offset portion being out of axial alignment with both said input shaft and said axis of rotation of the output member;
deformable means positively secured to said output member, said deformable means constructed of a material for transmitting torque from said input shaft to said output member that absorbs a predetermined force prior to deformation; and
a rigid member rotatably mounted on said offset portion and engaging said deformable means for rotating the deformable means to drive the output member directly and for deforming the deformable means repeatedly when a force in excess of said predetermined force is applied through the clutch to limit the torque delivered to the output member.

13. The clutch of claim 12 wherein said deformable means is normally symmetrical about an axis of rotation when in an undeformed state.

14. A clutch for limiting torque transmitted therethrough to a predetermined value comprising:
an output shaft;
an input shaft axially aligned with the output shaft;
an offset portion on said input shaft, said offset portion being out of axial alignment with both said input shaft and said output shaft;
a deformable tubular member of flexible material axially aligned at each end with said input and output shafts and attached at one end to said output member for transmitting torque thereto;
said material being characterized by the ability to resist substantial deformation upon application of torque below the predetermined value; and
means rotatably mounted on said offset portion and positioned within said tube to initially deform said tubular member and rotate said tubular member with said input shaft when the torque is less than the predetermined value and to deform said tubular member repeatedly to move said input shaft relative to said output shaft when the torque is greater than the predetermined value.

15. The clutch of claim 14 wherein the eccentric means is a roller bearing with an inner race fixed to the offset portion and an outer race secured to the inner surface of the tube.

16. The clutch of claim 14 wherein the flexible material of the deformable tubular member is Teflon.

17. A clutch for limiting to a predetermined value torque transmitted therethrough comprising:
an output shaft;
an input shaft axially aligned with the output shaft;

an offset portion on said input shaft, said offset portion being out of axial alignment with both said input shaft and said output shaft;

a plurality of identical flexible couplings fixed to said output shaft and equiangularly spaced about the axes of said output shaft and said input shaft;

said material characterized by the ability to resist substantial deformation upon application of torque below the predetermined value; and a plate rotatably mounted on said offset portion and having a surface normally disposed to the axis thereof to which said couplings are fixed wherein said plate slips relative to said input shaft alternately tensioning and compressing said couplings when the torque exceeds the predetermined value and wherein said plate rotates directly with said input shaft maintaining said couplings in a quiescent deformed state when the torque is less than the predetermined value.

18. The clutch of claim 17 wherein the couplings are made of silicon rubber.

References Cited

UNITED STATES PATENTS

| | | | |
|---|---|---|---|
| 3,654,777 | 4/1972 | Grundman | 64—30 D |
| 3,604,045 | 9/1971 | Smith | 64—30 D |

EDWARD G. FAVORS, Primary Examiner

U.S. Cl. X.R.

64—12